United States Patent
Smart et al.

(10) Patent No.: US 12,470,290 B2
(45) Date of Patent: Nov. 11, 2025

(54) DYNAMIC MULTIPATH SEARCHER REVISIT RATE FOR A WCDMA RECEIVER

(71) Applicant: Parallel Wireless, Inc., Nashua, NH (US)

(72) Inventors: Chris Smart, Wiltshire (GB); John Grogan, Wiltshire (GB)

(73) Assignee: Parallel Wireless, Inc., Nashua, NH (US)

( * ) Notice: Subject to any disclaimer, the term of this patent is extended or adjusted under 35 U.S.C. 154(b) by 257 days.

(21) Appl. No.: 18/057,761

(22) Filed: Nov. 21, 2022

(65) Prior Publication Data

US 2023/0163840 A1      May 25, 2023

Related U.S. Application Data

(60) Provisional application No. 63/281,203, filed on Nov. 19, 2021.

(51) Int. Cl.
   *H04B 7/26*          (2006.01)
(52) U.S. Cl.
   CPC .................. *H04B 7/2668* (2013.01)
(58) Field of Classification Search
   CPC ..... H04B 7/2628; H04B 7/264; H04B 7/2668
   See application file for complete search history.

(56) References Cited

U.S. PATENT DOCUMENTS

| | | | |
|---|---|---|---|
| 8,280,365 B1 | 10/2012 | Ben-Eli | |
| 8,340,159 B2 | 12/2012 | Zhang et al. | |
| 2002/0064217 A1* | 5/2002 | Ohsuge | H04B 1/7113 375/152 |
| 2003/0128748 A1* | 7/2003 | Rifaat | H04B 1/7113 375/E1.032 |
| 2004/0053592 A1* | 3/2004 | Reial | H04B 1/7113 455/296 |
| 2014/0348215 A1 | 11/2014 | Rigolle et al. | |

FOREIGN PATENT DOCUMENTS

| | | | | |
|---|---|---|---|---|
| EP | 1482651 A1 * | 12/2004 | ........... | H04B 1/7113 |
| TW | I285508 B | 8/2007 | | |
| WO | 2004112269 A1 | 12/2004 | | |
| WO | WO-2004107597 A1 * | 12/2004 | ........... | H04B 1/7113 |

* cited by examiner

*Primary Examiner* — Alpus Hsu
*Assistant Examiner* — Camquyen Thai
(74) *Attorney, Agent, or Firm* — Michael Y. Saji

(57) ABSTRACT

A method for dynamically adjusting the revisit rate of a rake receiver for an individual UE is disclosed, such that the time to initially acquire the UL transmission is optimized while the ongoing Central Processing Unit (CPU) loading during normal operation is minimized. The method may comprise operating a multipath searcher in a first mode of operation at a first time, the first mode being an acquisition mode, the multipath searcher operating with a revisit rate of 100 percent; and, operating the multipath searcher in a second mode of operation at a second time, the second mode being a steady-state mode and the multipath searcher operating with a revisit rate of less than 100 percent.

9 Claims, 6 Drawing Sheets

DYNAMIC MULTIPATH SEARCHER REVISIT RATE FOR A WCDMA RECEIVER

CROSS-REFERENCE TO RELATED APPLICATIONS

The present application claims priority under 35 U.S.C. § 119(e) to U.S. Provisional Pat. App. No. 63/281,203, having the title "Dynamic Multipath Searcher Revisit Rate for a WCDMA Receiver," and filed Nov. 19, 2021, which is also hereby incorporated by reference in its entirety. The present application also hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "Max-Mesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1; US20170055186A1; US20170273134A1; US20170272330A1; and Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

A rake receiver is a radio receiver designed to counter the effects of multipath fading. It does this using several sub-receivers called fingers, each of which is a correlator assigned to a different multipath component. Each multipath component is decoded independently and then subsequently added to improve reliability. Rake receivers are commonly used in a wide variety of radio equipment, including Wideband Code Division Multiple Access (WCDMA) equipment and other CDMA network equipment.

Wideband Code Division Multiple Access (WCDMA) is a method used for the air interface for certain 3G mobile networks. By using a scrambling code to scramble information that is transmitted, the air interface allows multiple access by a plurality of data streams.

SUMMARY

Disclosed herein is a method for dynamically adjusting the revisit rate of the MPS as far as an individual UE is concerned, such that the time to initially acquire the UL transmission is optimized while the ongoing Central Processing Unit (CPU) loading during normal operation is minimized.

In one embodiment, a method is disclosed for operating a rake receiver in a code division multiple access (CDMA) radio transceiver, comprising: operating a multipath searcher in a first mode of operation at a first time, the first mode being an acquisition mode, the multipath searcher operating with a revisit rate of 100 percent; and, operating the multipath searcher in a second mode of operation at a second time, the second mode being a steady-state mode and the multipath searcher operating with a revisit rate of less than 100 percent.

The method may further comprise operating the multipath searcher in the first mode of operation or the second mode of operation independently for a first user equipment (UE) and for a second user equipment (UE). The method may further comprise reducing operating load on a baseband processor in the second mode of operation by inactivating accumulation, peak detection, and thresholding of a received signal during certain accumulation periods. The method may further comprise terminating the first mode of operation and entering the second mode of operation upon expiration of a timer. The second mode of operation may further comprise varying between multiple revisit rates of less than 100 percent. The multipath searcher may be located at a virtual baseband unit (vBBU) using a fronthaul data connection between the CDMA radio transceiver and the vBBU. The CDMA transceiver may be a Wideband Code Division Multiple Access (WCDMA) transceiver. The revisit rate may be a rate at which delay profile results for an individual user equipment (UE) may be refreshed. The revisit rate may be configured with an upper limit and a lower limit.

DETAILED DESCRIPTION

The Multipath Searcher (MPS) is a key component in the physical layer processing of a Wideband Code Division Multiple Access (WCDMA) receiver, in some embodiments. The MPS is responsible for identifying multipath components in the uplink RF transmissions from each UE in the cell, such that a rake receiver demodulation chain (known as a rake finger) can be applied to each component. The time offsets and relative energies of these multipath components are known as the delay profile of the signal. The MPS is essentially a correlator which operates across a range of time offsets and detects at which offsets it finds significant RF energy; it measures the energy at each timing offset over an accumulation period and then at the end of that period it makes a decision about which offsets constitute noteworthy multipath components.

The MPS initially operates to find a delay profile containing one or more multipath components in order to acquire the UL transmission and start demodulation. It then subsequently operates to detect changes in the delay profile—that is to say, if/when existing multipath components have disappeared or new components have appeared—such that the rake receiver fingers can be updated.

The key characteristics of the MPS are: the width of the search window—i.e. the range of time offsets over which it searches, which determines the delay spread that can be supported in the Uplink (UL), which is an Radio Frequency (RF) characteristic of the environment in which the UE is operating; the position of the search window—i.e. the time offset at which the search window starts, this is related to the UE position within the cell and provides an upper bound on the supported cell radius; the accumulation period—also known as the dwell time, this is important to ensure that sufficient signal-to-noise ratio is extracted from the received signal before attempting to detect the multipath components; the detection threshold—this is important to ensure that all useful multipath components are detected; and the revisit rate—i.e. the rate at which delay profile results for an individual UE are refreshed, this determines how quickly the rake receiver can start operating when the link is initialized and how quickly it can respond to changes in the RF multipath environment.

The MPS is a computationally intensive element in the WCDMA receiver by virtue of the number of multiply-accumulate mathematical operations it needs to perform, especially when covering a wide search window for a large number of UEs. In a traditional NodeB, the MPS would typically be implemented as a hardware accelerator coupled to a Digital signal Processor (DSP) baseband receiver. In the Parallel Wireless VBBU product, the MPS is implemented entirely in software running on a general-purpose processor—this introduces a number of challenges associated with meeting the required performance whilst optimising the CPU loading due to multipath searching.

DETAILED DESCRIPTION

Figure 1:
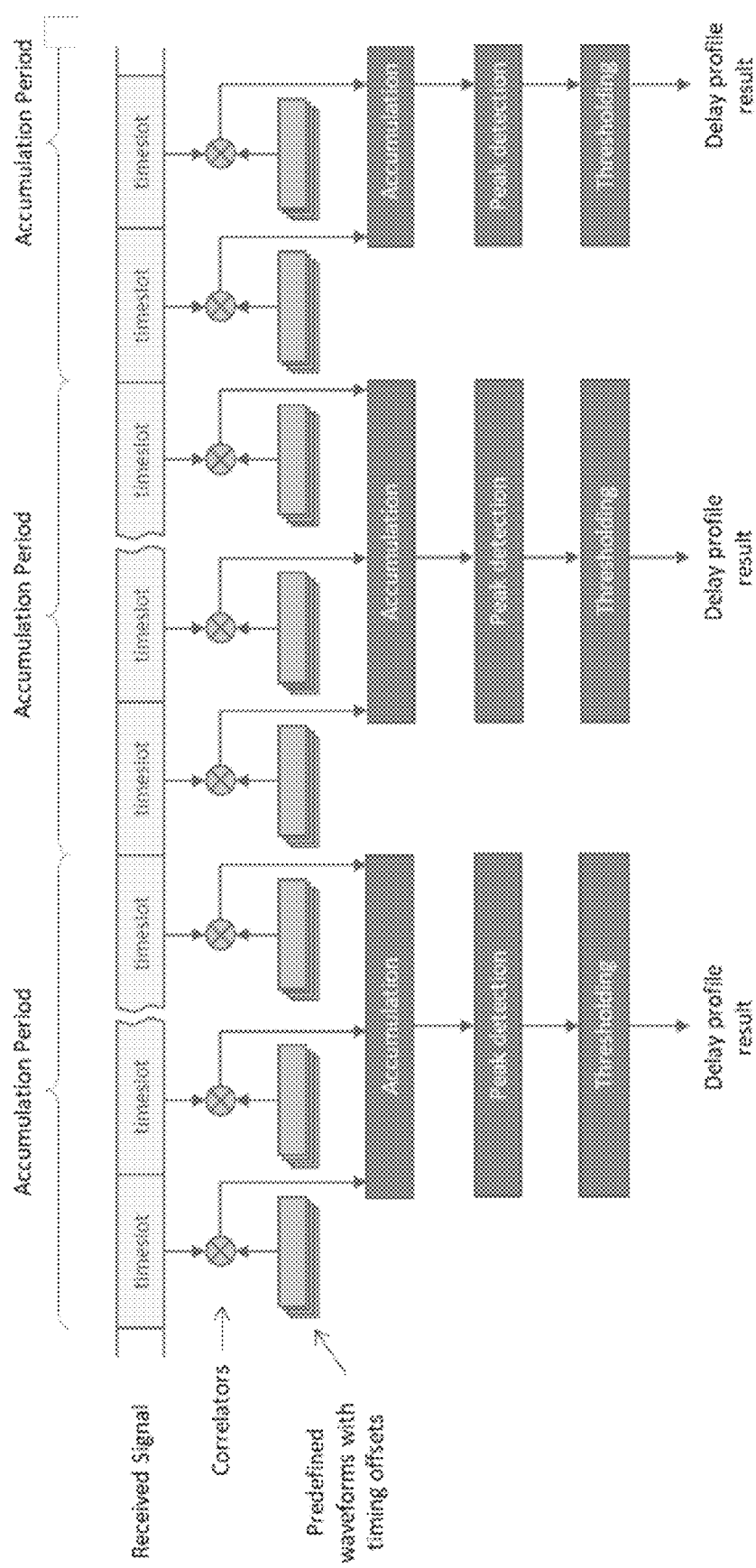
FIG. 1 is a schematic drawing showing accumulation processing for a given UE over several accumulation periods, in accordance with the prior art.

The basic operation of a multipath searcher is illustrated in FIG. 1 (prior art). The received signal is processed in arbitrary sized units labelled above as timeslots. Each timeslot is correlated with multiple predefined waveforms, each with a successively increasing time offset. (Note that this correlation operation is mathematically equivalent to using a single predefined waveform and correlating with multiple time-shifted versions of the received signal.) The result of each correlation is accumulated across the accumulation period and then processed with peak detection and thresholding algorithms in order to generate the delay profile result.

The outcome of the above processing is a delay profile result for every accumulation period. For the User Equipment (UE) being processed, this can be identified as a 100% revisit rate—i.e. the UE is searched (revisited) on 100% of the accumulation periods.

While a revisit rate of 100% allows for any changes in the delay profile, typically associated with UE mobility, to be rapidly detected, it also means that each UE is consuming MPS resources all the time. With a software-based implementation such as the VBBU, this translates into a maximal demand on CPU resources.

Figure 2:
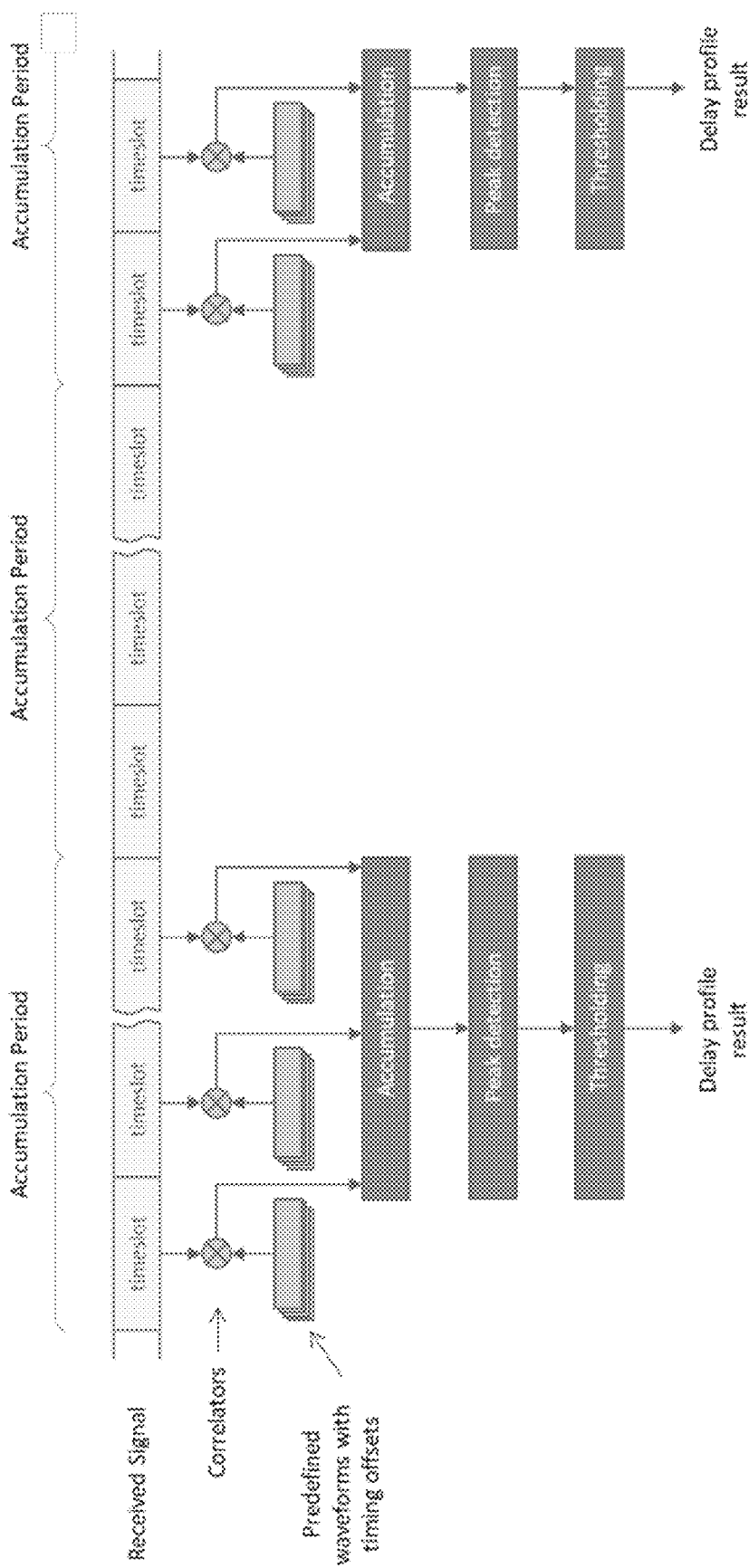
FIG. 2 is a schematic drawing showing accumulation processing for a given UE over alternating accumulation periods, in accordance with some embodiments.

Consider instead the case illustrated in FIG. 2, where the MPS processing for a given UE is only carried out in alternate accumulation periods. The outcome of the above processing with a 50% revisit rate is twofold: firstly, the delay profile results will only be refreshed at half the rate they were previously available; secondly, the processing load associated with the MPS will be halved.

In general, it can be appreciated that a reduction in the revisit rate for a given UE will result in a corresponding reduction in the processing load and corresponding increase in the time between fresh delay profile results becoming available. The revisit rate can therefore be seen to be a configurable parameter that allows for a trade-off between MPS processing load and receiver performance in a time-varying RF environment.

The purpose of this invention is to dynamically adjust the MPS revisit rate such that the initial time to acquire the received signal is minimized; and the ongoing processing load is optimized for the RF environment.

Figure 3:
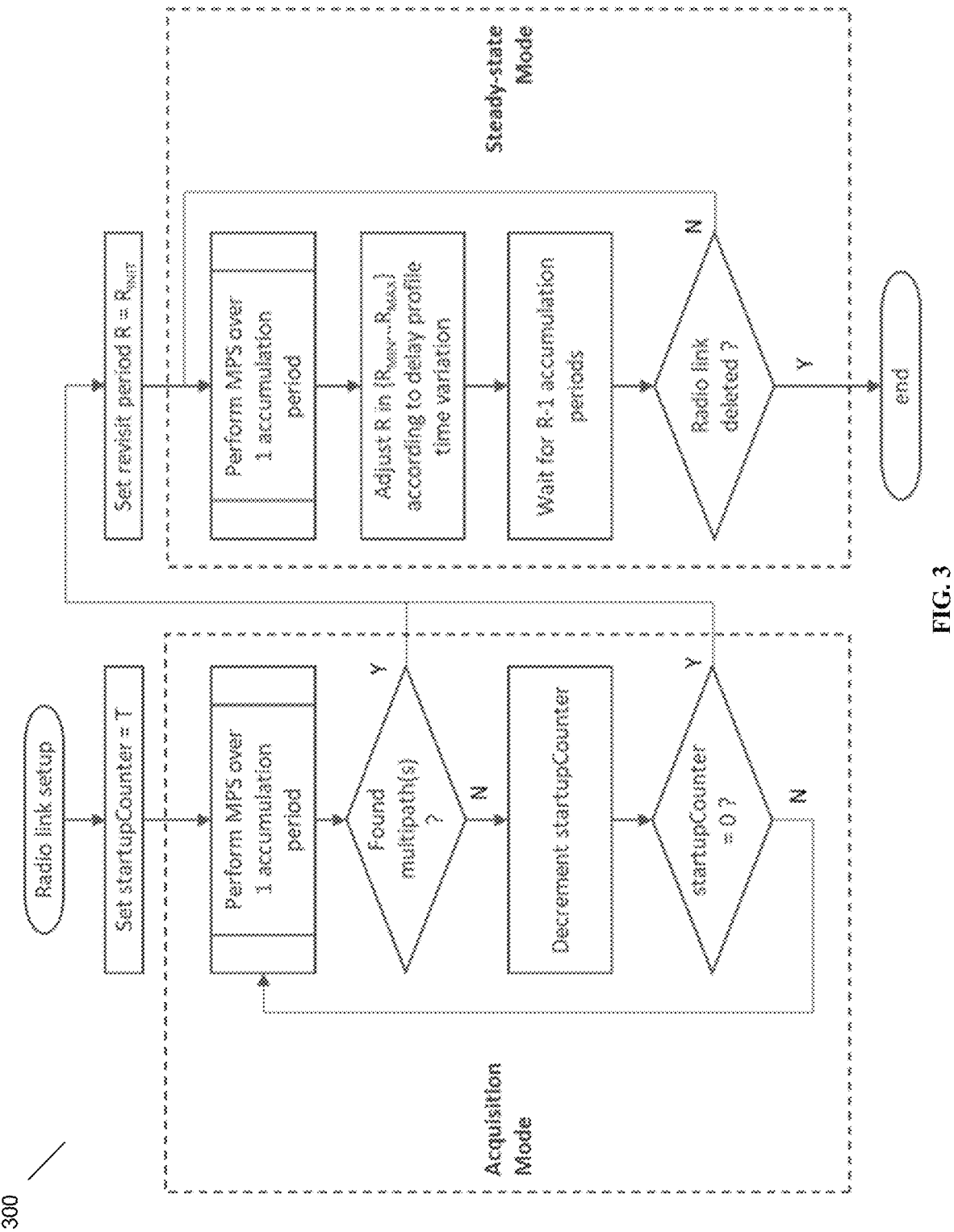
FIG. 3 is a flowchart for multipath accumulation, in accordance with some embodiments.

The flowchart in FIG. 3 illustrates this. From FIG. 3 it can be seen that the MPS initially operates with a revisit rate of 100% when the radio link is established for a given UE. That is to say, it searches for multipath components in every accumulation period as in FIG. 1 earlier. This is shown above as the Acquisition Mode of operation.

The searcher remains in Acquisition Mode until one of the following events occurs, either: one or more multipath components is detected, at which point the rake receiver will be configured according to the detected delay profile and demodulation can begin; or the startupCounter expires after T accumulation periods.

The first condition ensures that we exit from Acquisition Mode as soon as we have acquired the UE's transmission. The second condition ensures that we forcibly abandon Acquisition Mode in the case when we are unable to detect the UE's transmission for a prolonged period of time.

On exiting Acquisition Mode, we configure the revisit-Period to have a value $R=R_{INIT}$ and enter Steady-state Mode. In this mode we only perform the MPS functionality in 1 accumulation period out of every R periods—that is to say, the revisit rate is reconfigured to 100%/R.

Normally we would expect to enter Steady-state Mode through condition i) above, in which case we will have an operating rake receiver and periodic opportunities to refresh the delay profile. If however we enter Steady-state Mode through condition ii), which is essentially an error condition, then we will not yet have an operating rake receiver but we will continue to perform periodic searches in an attempt to acquire the UE's transmission.

Additionally, during operation in Steady-state Mode, the value of R may be periodically or dynamically modified on a per-UE basis to reflect analysis of the channel behavior. Larger R values optimize for CPU loading when the channel is identified as having slowly changing paths, whereas smaller R optimize for active-path detection when the channel is identified as having fast changing paths. Limiting values $R_{MIN}$ and $R_{MAX}$ are used to enforce an upper limit on MPS processing load and a lower limit on the revisit rate respectively.

This two-state approach, switching from an initial 100% revisit rate to a 100%/R revisit rate upon acquisition, combined with the adaptation of the R parameter to suit the time-varying channel conditions, can be seen to minimize the time taken to acquire the UE's transmission while also optimizing the steady-state processing load.

The multipath searcher has two modes of operation—Acquisition Mode and Steady-state Mode. In Acquisition Mode the multipath searcher operates with a revisit rate of 100% in order to minimize the time taken to acquire the UE's transmission. In Steady-state Mode the multipath searcher operates with a reduced revisit rate in order to minimize the processing load—this is especially relevant in a software-based implementation. The transition from Acquisition Mode to Steady-state Mode is triggered automatically by the successful detection of multipath components. The transition from Acquisition Mode to Steady-state Mode is also triggered automatically by the expiry of a timer in order to protect against processing overload under failure conditions.

Acquisition Mode is characterized by a parameter, T in FIG. 3, which defines the maximum duration of Acquisition Mode in terms of the number of accumulation periods. Steady-state Mode is characterized by a parameter, R in FIG. 3, such that the reduced revisit rate is defined to be 100%/R. The value of R to use in Steady-state Mode is initialized to a pre-defined value, $R_{INIT}$, and then dynamically adjusted within the range $R_{MIN} \ldots R_{MAX}$ in order to optimize the revisit rate to the time-varying RF environment.

A variety of revisit rates are possible, in some embodiments, with the value of 100%/R being determined to suit the channel and the desired load. In some embodiments the value of 100%/R can be configured based on the desired level of performance for UEs that are undergoing mobility (i.e., actively moving from place to place). Lower 100%/R ratios will still provide good performance when a UE is not moving. Different 100%/R ratios could be provided for different UEs, in some embodiments.

Figure 4:
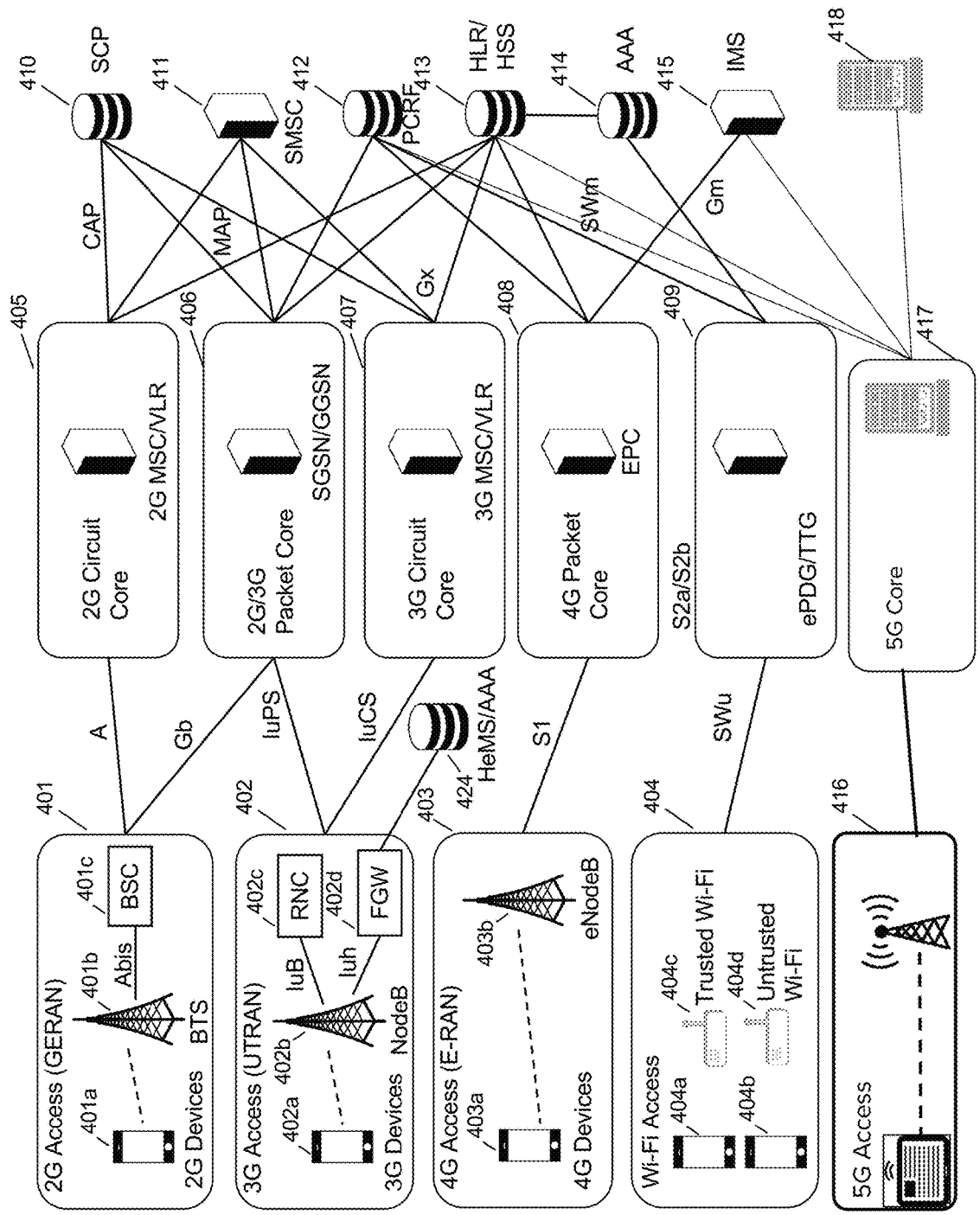
FIG. 4 is a schematic network architecture diagram for 3G and other-G networks, in accordance with some embodiments.

FIG. 4 is a schematic network architecture diagram for 3G and other-G prior art networks. The diagram shows a plurality of "Gs," including 2G, 3G, 4G, 5G and Wi-Fi. 2G is represented by GERAN 401, which includes a 2G device 401a, BTS 401b, and BSC 401c. 3G is represented by UTRAN 402, which includes a 3G UE 402a, nodeB 402b, RNC 402c, and femto gateway (FGW, which in 3GPP namespace is also known as a Home nodeB Gateway or HNBGW) 402d. 4G is represented by EUTRAN or E-RAN 403, which includes an LTE UE 403a and LTE eNodeB 403b. Wi-Fi is represented by Wi-Fi access network 404, which includes a trusted Wi-Fi access point 404c and an untrusted Wi-Fi access point 404d. The Wi-Fi devices 404a and 404b may access either AP 404c or 404d. In the current network architecture, each "G" has a core network. 2G circuit core network 405 includes a 2G MSC/VLR; 2G/3G packet core network 406 includes an SGSN/GGSN (for EDGE or UMTS packet traffic); 3G circuit core 407 includes a 3G MSC/VLR; 4G circuit core 408 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 430, the SMSC 431, PCRF 432, HLR/HSS 433, Authentication, Authorization, and Accounting server (AAA) 434, and IP Multimedia Subsystem (IMS) 435. An HeMS/AAA 436 is present in some cases for use by the 3G UTRAN. The diagram is used to indicate schematically the basic functions of each network as known to one of skill in the art, and is not intended to be exhaustive. For example, 5G core 417 is shown using a single interface to 5G access 416, although in some cases 5G access can be supported using dual connectivity or via a non-standalone deployment architecture.

Noteworthy is that the RANs 401, 402, 403, 404 and 436 rely on specialized core networks 405, 406, 407, 408, 409, 437 but share essential management databases 430, 431, 432, 433, 434, 435, 438. More specifically, for the 2G GERAN, a BSC 401c is required for Abis compatibility with BTS 401b, while for the 3G UTRAN, an RNC 402c is required for Iub compatibility and an FGW 402d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. The present invention is also applicable for 5G networks since the same or equivalent functions are available in 5G. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 5:
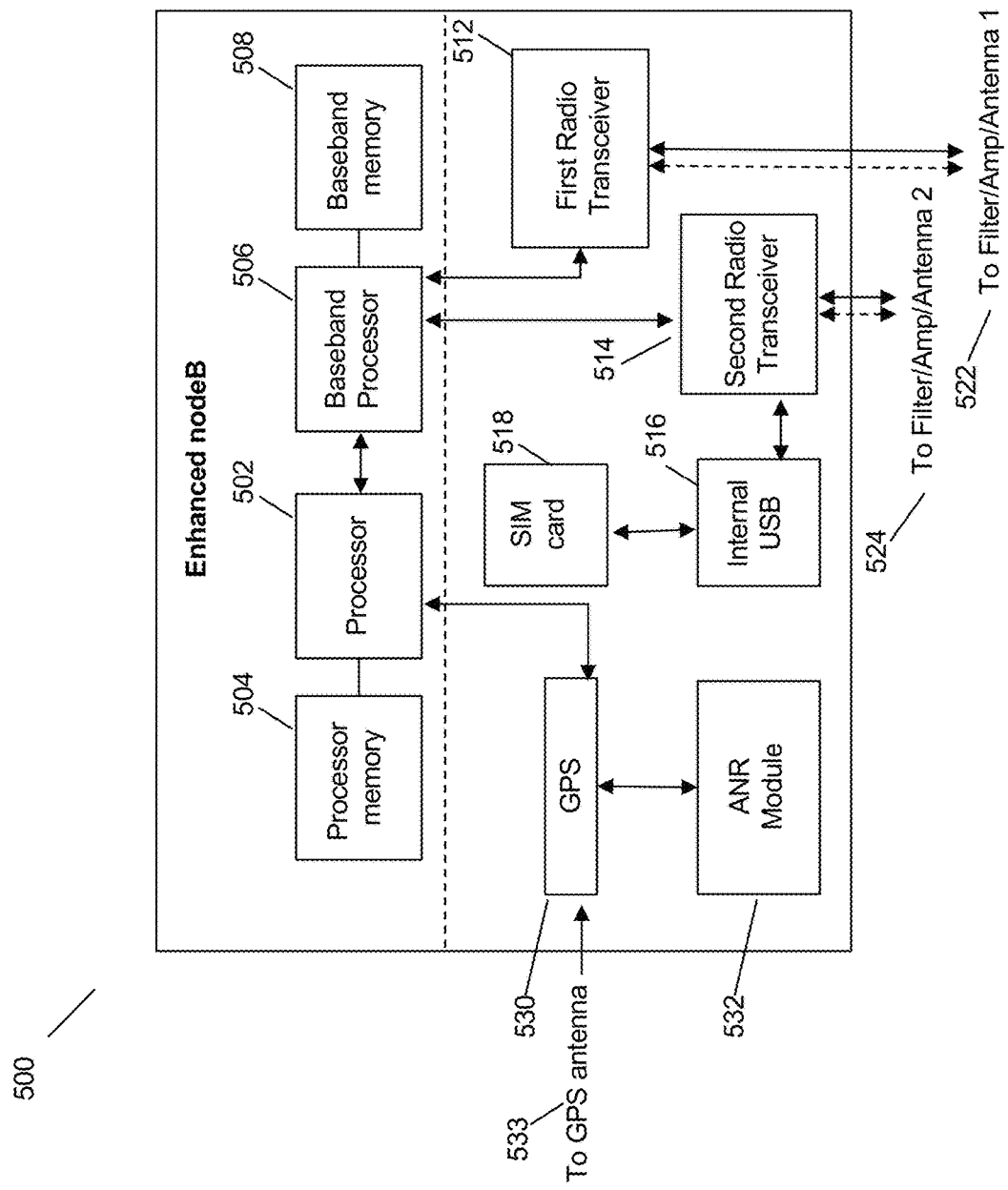
FIG. 5 is an enhanced eNodeB for performing the methods described herein, in accordance with some embodiments.

FIG. 5 is an enhanced nodeB for performing the methods described herein, in accordance with some embodiments. nodeB 500 may include processor 502, processor memory 504 in communication with the processor, baseband processor 506, and baseband processor memory 508 in communication with the baseband processor. Mesh network node 500 may also include first radio transceiver 512 and second radio transceiver 514, internal universal serial bus (USB) port 516, and subscriber information module card (SIM card) 518 coupled to USB port 516. In some embodiments, the second radio transceiver 514 itself may be coupled to USB port 516, and communications from the baseband processor may be passed through USB port 516. The second radio transceiver may be used for wirelessly backhauling nodeB 500.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 512 and 514. Baseband processor 506 may use memory 508 to perform these tasks.

The first radio transceiver 512 may be a radio transceiver capable of providing 3G nodeB functionality, and may be capable of higher power and multi-channel OFDMA. The second radio transceiver 514 may be a radio transceiver capable of providing 3G UE functionality. Both transceivers 512 and 514 may be capable of receiving and transmitting on one or more 3G bands. In some embodiments, either or both of transceivers 512 and 514 may be capable of providing both 3G nodeB and 3G UE functionality. Transceiver 512 may be coupled to processor 502 via a Peripheral Component Interconnect-Express (PCI-E) bus, and/or via a daughtercard. As transceiver 514 is for providing 3G UE functionality, in effect emulating a user equipment, it may be connected via the same or different PCI-E bus, or by a USB bus, and may also be coupled to SIM card 518. First transceiver 512 may be coupled to first radio frequency (RF) chain (filter, amplifier, antenna) 522, and second transceiver 514 may be coupled to second RF chain (filter, amplifier, antenna) 524.

SIM card 518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target nodeB that device 500 is not an ordinary UE but instead is a special UE for providing backhaul to device 500.

In some embodiments, the nodeB may be a virtual baseband unit, provided in a separate location from a radio unit and connected via a fronthaul RF connection delivering RF samples to the virtual baseband unit (vBBU). In some embodiments, the vBBU may provide 3G in addition to one or more other radio access technologies (RATs), such as 2G, 4G, or 5G. In some embodiments, a vBBU may provide 3G while other RATs are provided by other baseband units, including cloud baseband or integrated baseband.

Wired or wireless fronthaul or backhaul may be used. Backhaul or fronthaul may be an Ethernet-based (including Gigabit Ethernet), or a fiber-optic connection, or a cable-based connection, in some embodiments. Additionally, wireless connections may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein.

Other elements and/or modules may also be included, such as a home nodeB, a local gateway (LGW), a self-organizing network (SON) module, or another module. Additional radio amplifiers, radio transceivers and/or wired network connections may also be included.

Figure 6:
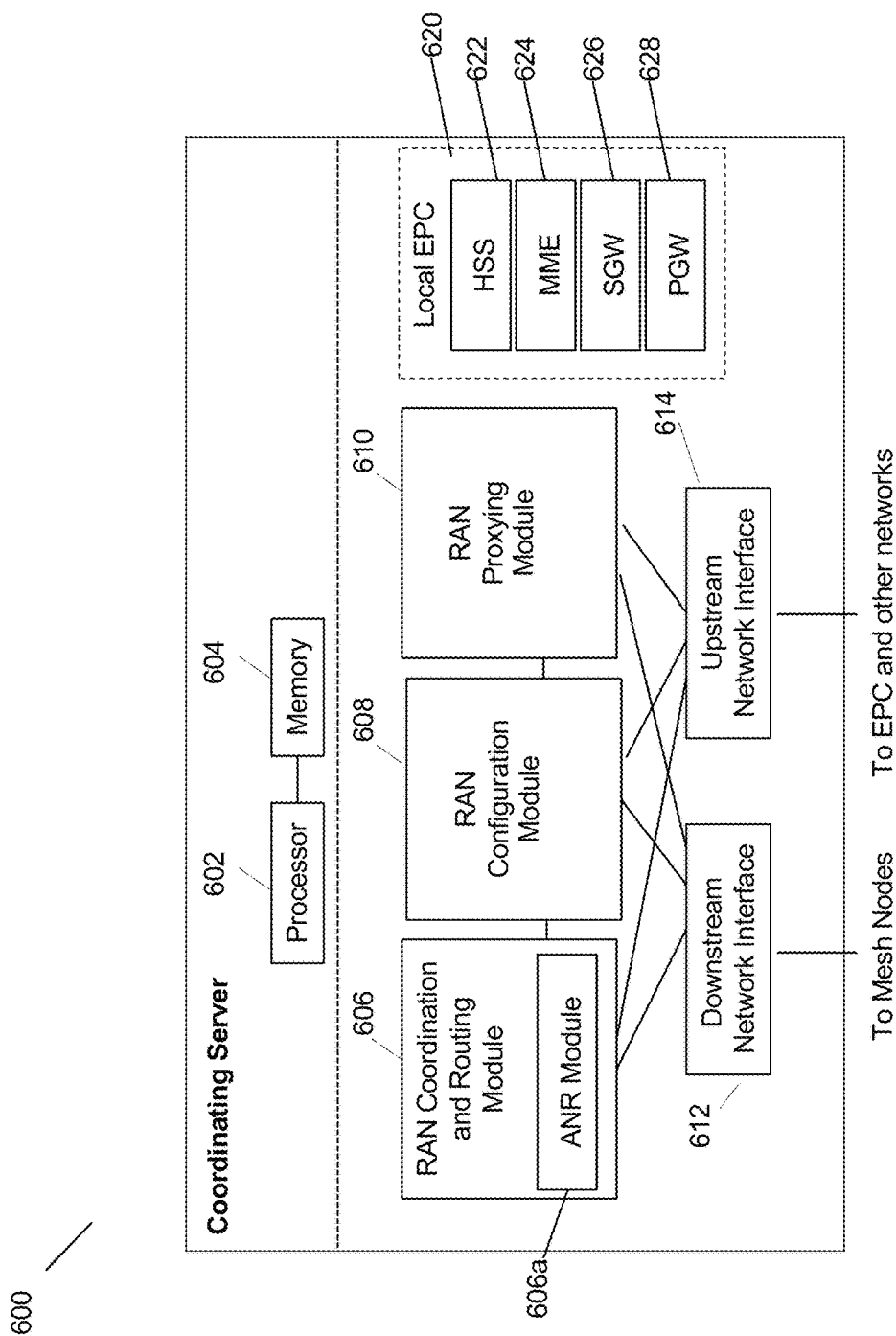
FIG. 6 is a coordinating server for providing services and performing methods as described herein, in accordance with some embodiments.

FIG. 6 is a coordinating server for providing services and performing methods as described herein, in accordance with some embodiments. Coordinating server 600 includes processor 602 and memory 604, which are configured to provide the functions described herein. Also present are radio access network coordination/routing (RAN Coordination and routing) module 606, including ANR module 606a, RAN configuration module 608, and RAN proxying module 610. The ANR module 606a may perform the ANR tracking, PCI disambiguation, ECGI requesting, and GPS coalescing and tracking as described herein, in coordination with RAN coordination module 606 (e.g., for requesting ECGIs, etc.). In some embodiments, coordinating server 600 may coordinate multiple RANs using coordination module 606. In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet).

Coordinator 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

In any of the scenarios described herein, where processing may be performed at the cell, the processing may also be performed in coordination with a cloud coordination server. A mesh node may be an nodeB. An nodeB may be in communication with the cloud coordination server via an X2 protocol connection, or another connection. The nodeB may perform inter-cell coordination via the cloud communication server when other cells are in communication with the cloud coordination server. The nodeB may communicate with the cloud coordination server to determine whether the UE has the ability to support a handover to Wi-Fi, e.g., in a heterogeneous network.

The present disclosure may be applied to other non-WCDMA radio access technologies that utilize a rake receiver radio processing chain, including other CDMA radio access technologies (1×RTT CDMA, CDMA2000, etc.), in some embodiments.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for operating a rake receiver in a code division multiple access (CDMA) radio transceiver, comprising:

operating a multipath searcher in a first mode of operation at a first time, wherein the first mode is an acquisition mode wherein the multipath searcher operates with a revisit rate of 100 percent; and, operating the multipath searcher in a second mode of operation at a second time, wherein the second mode is a steady-state mode wherein the multipath searcher operates with a revisit rate of less than 100 percent.

2. The method of claim 1, wherein the multipath searcher is located at a virtual baseband unit (vBBU) using a fronthaul data connection between the CDMA radio transceiver and the vBBU.

3. The method of claim 1, wherein the CDMA transceiver is a Wideband Code Division Multiple Access (WCDMA) transceiver.

4. The method of claim 1, the second mode of operation further comprising varying between multiple revisit rates of less than 100 percent.

5. The method of claim 1, further comprising operating the multipath searcher in the first mode of operation or the second mode of operation independently for a first user equipment (UE) and for a second user equipment (UE).

6. The method of claim 1, further comprising reducing operating load on a baseband processor in the second mode of operation by inactivating accumulation, peak detection, and thresholding of a received signal during certain accumulation periods.

7. The method of claim 1, wherein the revisit rate is a rate at which delay profile results for an individual user equipment (UE) are refreshed.

8. The method of claim 1, wherein the revisit rate is configured with an upper limit and a lower limit.

9. The method of claim 1, further comprising terminating the first mode of operation and entering the second mode of operation upon expiration of a timer.

* * * * *